US00RE40196E

(19) United States
(12) Reissued Patent
Sullivan

(10) Patent Number: US RE40,196 E
(45) Date of Reissued Patent: Apr. 1, 2008

(54) LIVESTOCK BLOW DRYER

(75) Inventor: John L. Sullivan, Dunlap, IA (US)

(73) Assignee: Sullivan Supply, Inc., Dunlap, IA (US)

(21) Appl. No.: 10/692,271
(22) Filed: Oct. 23, 2003

Related U.S. Patent Documents

Reissue of:
(64) Patent No.: 6,305,325
Issued: Oct. 23, 2001
Appl. No.: 09/430,709
Filed: Oct. 29, 1999

U.S. Applications:
(63) Continuation-in-part of application No. 29/108,807, filed on Aug. 3, 1999, now Pat. No. Des. 427,388.

(51) Int. Cl.
*A01K 13/00* (2006.01)
*A01K 29/00* (2006.01)

(52) U.S. Cl. ..... 119/600; 119/668
(58) Field of Classification Search ..... 119/600, 119/608, 609, 668; 54/79.1; 34/283; 15/300.1; 95/273, 274; D28/12, 13, 17, 18, 98; D32/21; 219/222, 229
See application file for complete search history.

(56) References Cited

U.S. PATENT DOCUMENTS

| | | | | | |
|---|---|---|---|---|---|
| D43,011 | S | * | 9/1912 | Owen | D32/21 |
| D132,815 | S | * | 6/1942 | Stevens | D32/21 |
| 2,353,247 | A | | 7/1944 | Kuettel | |
| 2,597,215 | A | | 5/1952 | Wright et al. | |
| 2,713,627 | A | | 7/1955 | Kamataris | |
| 2,808,124 | A | | 10/1957 | Attwood | |
| 2,898,691 | A | | 8/1959 | Moseman | |
| 3,261,107 | A | | 7/1966 | Ponczer et al. | |
| 3,418,452 | A | | 12/1968 | Grabner | |
| 3,596,636 | A | | 8/1971 | Stobaugh | |
| 3,683,512 | A | | 8/1972 | Beam, Jr. | |
| D257,904 | S | | 1/1981 | Hamm, Jr. | |
| 4,309,595 | A | | 1/1982 | Long et al. | |
| 4,718,375 | A | * | 1/1988 | Krieger | 54/79.1 |
| 4,972,065 | A | | 11/1990 | Ohlsen | |
| 4,977,690 | A | * | 12/1990 | Davis, Jr. | 119/606 |
| 4,999,928 | A | | 3/1991 | Tozier | |
| D319,694 | S | | 9/1991 | Wortham | |
| D320,680 | S | | 10/1991 | Stetson et al. | |
| 5,216,822 | A | | 6/1993 | Madiedo | |
| D343,698 | S | * | 1/1994 | Sharples | D28/13 |
| 5,331,748 | A | | 7/1994 | Miller, Jr. | |
| 5,433,017 | A | | 7/1995 | Brauchli et al. | |
| 5,435,269 | A | * | 7/1995 | Chen | 119/668 |
| 5,553,632 | A | | 9/1996 | Burkhardt | |
| 5,681,630 | A | | 10/1997 | Smick et al. | |
| 5,701,681 | A | | 12/1997 | Wonka et al. | |
| 5,724,918 | A | * | 3/1998 | Navalon-Chicote | 119/668 |
| 5,766,316 | A | * | 6/1998 | Gates | 95/273 |
| 5,810,911 | A | | 9/1998 | Behrendt et al. | |
| 5,974,690 | A | * | 11/1999 | Canada | 34/444 |
| D428,528 | S | * | 7/2000 | Deguines | D28/13 |
| D462,140 | S | * | 8/2002 | Watanabe et al. | D28/13 |
| D468,862 | S | * | 1/2003 | Barski | D28/13 |

OTHER PUBLICATIONS

*Sullivan Company Mail Order Catalog*, vol. 7, (1995), p. 4.
"Blowers and Dryers", *ShowTime Online Catalog*, (Nov. 1, 2002), 1 page.

* cited by examiner

*Primary Examiner*—Thomas Price
(74) *Attorney, Agent, or Firm*—Schwegman, Lundberg & Woessner P.A.

(57) ABSTRACT

A livestock blow dryer includes a blower housing having an inlet opening and an outlet opening with a slot adjacent to the inlet opening. Within the blower housing are two blower motors for blowing air through the outlet opening. The blow dryer includes a filter cartridge adapted to be inserted into the slot so that air coming through inlet opening goes through the filter. The filter cartridge includes an outer perimeter section, a filter section within the outer perimeter, and a tab attached to the cartridge for inserting and removing the filter cartridge to and from the slot. The livestock blow dryer includes a frusto-conical shaped nozzle adapted to cover the outlet opening. The end of the nozzle has a holding member for attaching a hose to the nozzle.

36 Claims, 4 Drawing Sheets

LIVESTOCK BLOW DRYER

Matter enclosed in heavy brackets [ ] appears in the original patent but forms no part of this reissue specification; matter printed in italics indicates the additions made by reissue.

*RELATED APPLICATIONS*

*This application claims priority under 35 U.S.C. §120 and is a continuation-in-part of U.S. application Ser. No. 29/108,807, filed on Aug. 3, 1999, now U.S. Pat. No. Des. 427,388, issued Jun. 27, 2000.*

FIELD OF THE INVENTION

This invention relates to the field of animal husbandry, and more specifically to an apparatus for blow drying livestock

BACKGROUND OF THE INVENTION

Cattle owners and other livestock owners have a variety of products they use to prepare their animals for shows and competitions. The owners use products and devices such as hair clippers, shampoos, lotions, polishes, and brushes. The animals also must be washed and dried to keep them clean and ready for showing.

A device used to dry off livestock after they have been washed is called a livestock blow dryer. These are large blow dryers containing a relatively large blower motor or motors which blow air onto the animal to dry the animal after being cleaned.

Among the problems with these devices are that they do not efficiently blow an optimal amount of air onto the animal, and they do not heat the outgoing air very much. For these reasons it can take a long time to dry an animal.

Another problem is that the machines are used in fairly rugged environments and thus are exposed to damage from the animals and/or from the harsh environment. One common form of damage in current blow dryers is that the air filters can break or get knocked off.

Thus, there is a need for an efficient, sturdy, livestock blow dryer which can dry an animal quickly while eliminating these problems.

SUMMARY OF THE INVENTION

The present invention provides an efficient and sturdy livestock blow dryer. The blow dryer includes a blower housing having an inlet opening and an outlet opening and filter holding section adjacent to the inlet opening. Within the blower housing is a blower motor or motors for blowing air through the outlet opening. The blow dryer includes a filter cartridge adapted to be inserted into the filter holding section.

In further embodiments, the filter cartridge includes an outer perimeter section, a filter section within the outer perimeter, and a tab attached to the cartridge for inserting and removing the filter cartridge to and from the slot.

Another aspect of the present invention provides the livestock blow dryer with a frusto-conical shaped nozzle. The nozzle has a holding member for attaching a hose to the nozzle.

The present invention provides a livestock blow dryer that efficiently blows an optimal amount of air, and thus can quickly dry an animal. The blower dryer also can be used in rugged conditions because its filter is not exposed to outside forces which could break it or knock it off.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digits of reference numbers appearing in the Figures generally corresponds to the Figure number in which that component is first introduced, such that the same reference number is used throughout to refer to an identical component which appears in multiple Figures.

Figure 1:
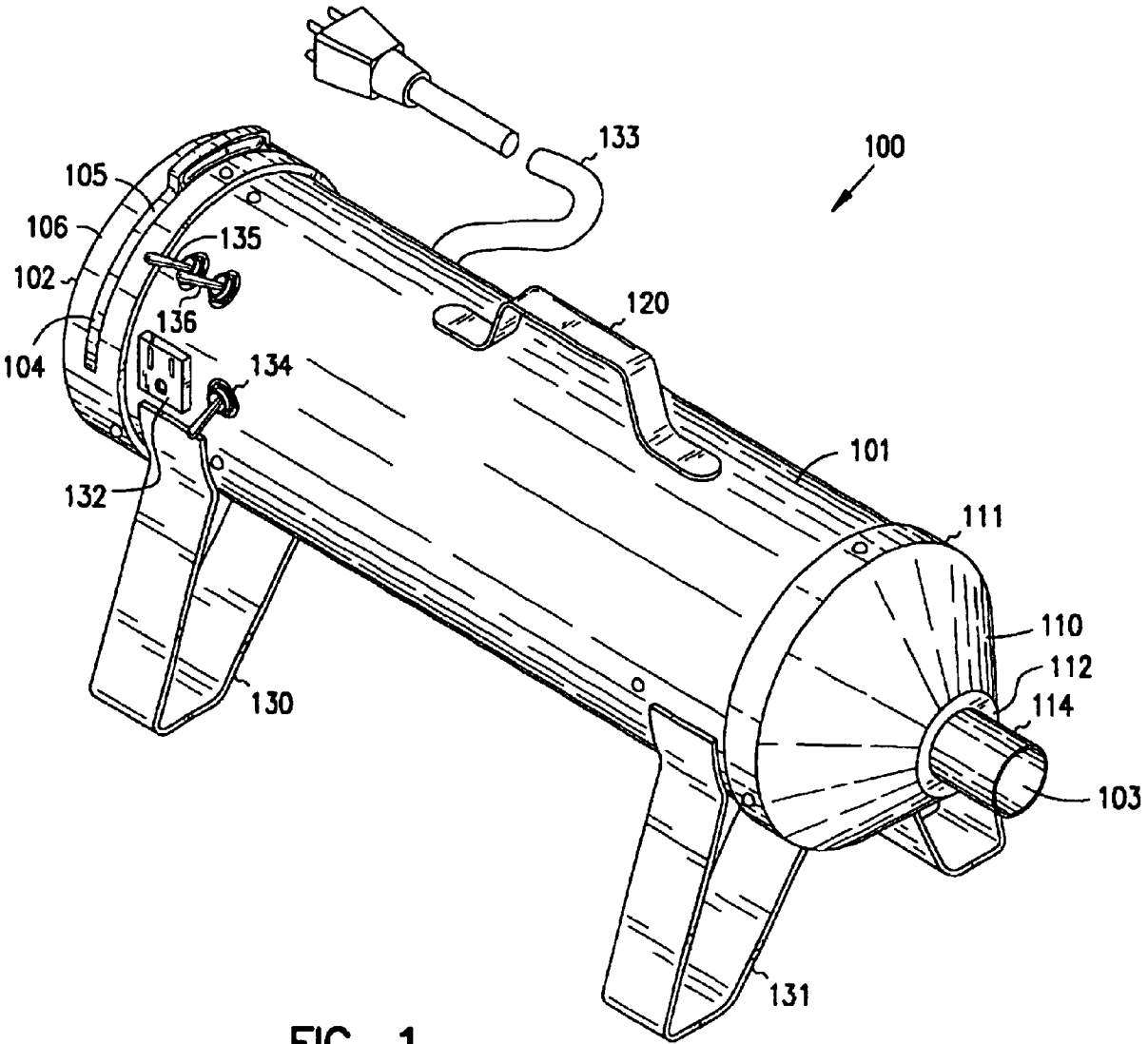
FIG. 1 shows front isometric view of one embodiment of a livestock blow dryer according to the present invention.
Figure 2:
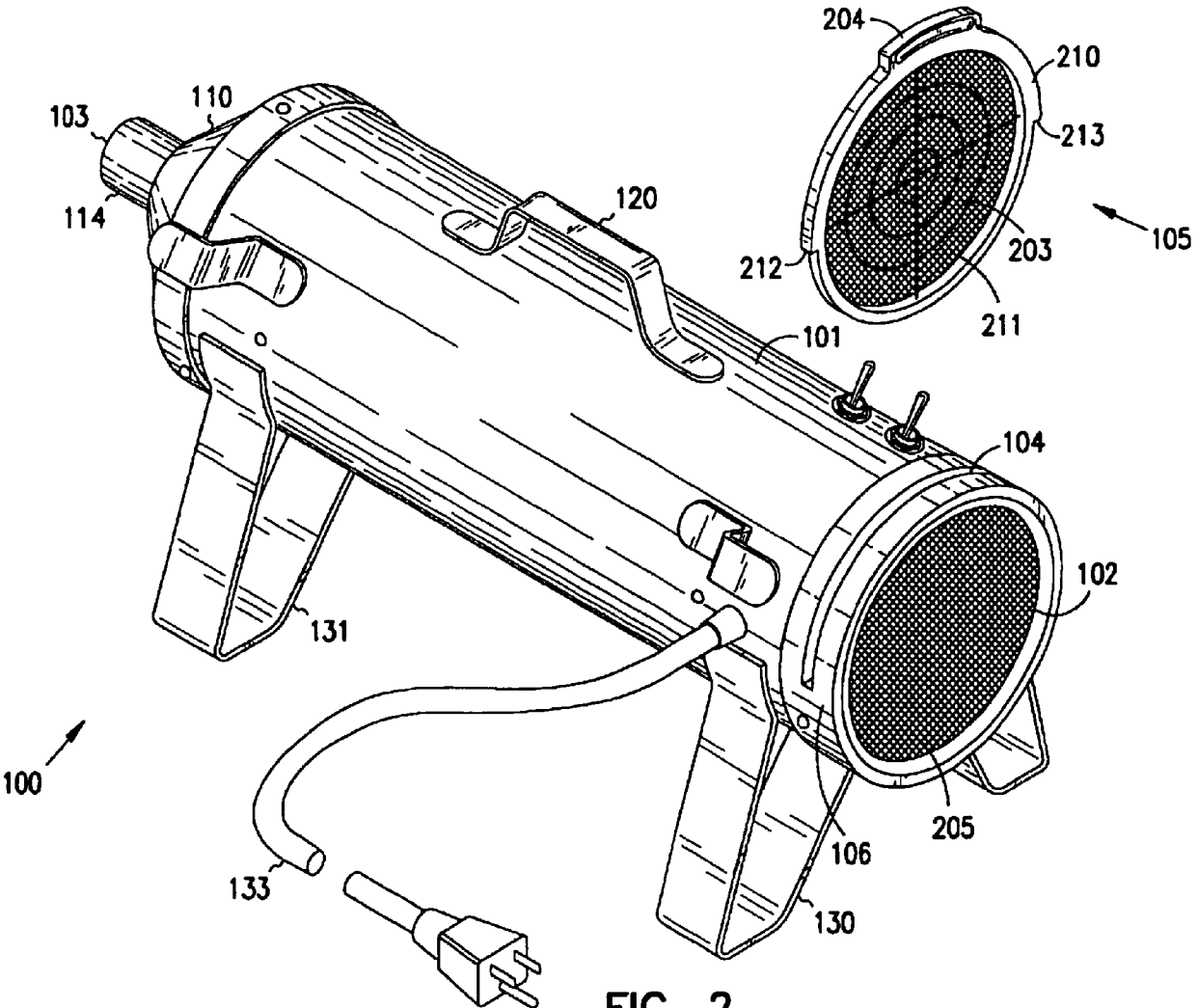
FIG. 2 shows a rear isometric view of the livestock blow dryer of FIG. 1.

FIGS. 1 and 2 show one embodiment of a livestock blow dryer 100. Blow dryer 100 includes a blower housing 101 having an inlet opening 102 and an outlet opening 103. Blower housing 101 has a cylindrical shape with a circular inlet opening 102 encompassing a first end of the cylinder and the outlet end 103 at the directly opposing end of the cylinder. In one embodiment, blower housing 101 has a metal, seamless body construction of approximately 6.5 inches in diameter and approximately eighteen to twenty-four inches long. The seamless body construction provides that air cannot leak out of the housing. In this embodiment, the cylindrical shape and direct flow-through of the air provides an optimal efficiency. However, those skilled in the art will recognize that the shape of the blower housing can be varied for different design reasons and that the inlet and outlet openings can be on different surfaces of the housing if concerns such as convenience override the energy efficiency concern.

Livestock blow dryer 100 also includes a filter cartridge 105. Filter cartridge 105 is adapted to be inserted into a filter holding section such as a slot 104. In this embodiment, slot 104 is located within an inlet cap member 106. Inlet cap member 106 is a circular, plastic member attached to the inlet opening end of blower housing 101. Filter holding section or slot 104 is located adjacent to the inlet opening 102 such that it is closely proximate and parallel to the face of the inlet opening 102. Slot 104 is open on the top side of inlet cap member 106 so that filter cartridge 105 can be easily removed and inserted in a direction perpendicular to an axial direction of the cylindrical blower housing. When inserted, the filter cartridge intercepts almost all the air coming in through air inlet opening 102. Thus, the slot provides a mounting means for the filter cartridge so that the filter cartridge is not exposed to outside forces which could cause damage to the filter cartridge and/or cause it to fall off.

In one embodiment, filter cartridge 105 is made from molded plastic. It includes a an outer perimeter section 210 which is relatively thin, having a size approximately the same or slightly bigger than the thickness of the walls of blower housing 101. The thin size of outer perimeter section 210 provides that the filter cartridge does not block much of the incoming air. On opposing sides of filter cartridge 105 are notches 212 and 213. Notches 212 and 213 provide mounting sections when filter cartridge 105 is placed within slot 104. When the filter cartridge is mounted within slot 104, notch 212 and 213 rest on the opposing ends of the slot (see FIG. 1). Filter cartridge 105 also includes a plurality of plastic ribs 211.

Filter cartridge 105 also includes a filter section 203 attached to outer perimeter section 210 and ribs 211. Filter section 203 intercepts airborne particles and is effective for dust and particle removal. In one embodiment, filter section 203 is an ester reticulated foam material, manufactured by Crest, Co. (Jackson, N.J.). In this embodiment, filter section 203 is permanently molded to ribs 211 and outer perimeter section 210 during the manufacturing process. This provides that the filter section will not come loose from the ribs or outer perimeter section, and it provides that there are no gaps that would allow particles to go through the filter cartridge. When filter section 203 gets too dirty, it can be easily washed. This is accomplished by removing filter cartridge 105 from the blower housing and washing the filter section. Alternatively, the filter cartridge 105 as a whole can be replaced after extended use.

In one embodiment, filter cartridge 105 has a circular shape having approximately the same diameter (approximately 6.5 inches) as the cylindrical blower housing. This shape allows the filter cartridge to be mounted within the blower housing without being exposed to outside damage. Filter cartridge 105 also includes a tab 204 attached to the outer perimeter for removing and inserting the filter cartridge 105 to and from slot 104.

Figure 3:
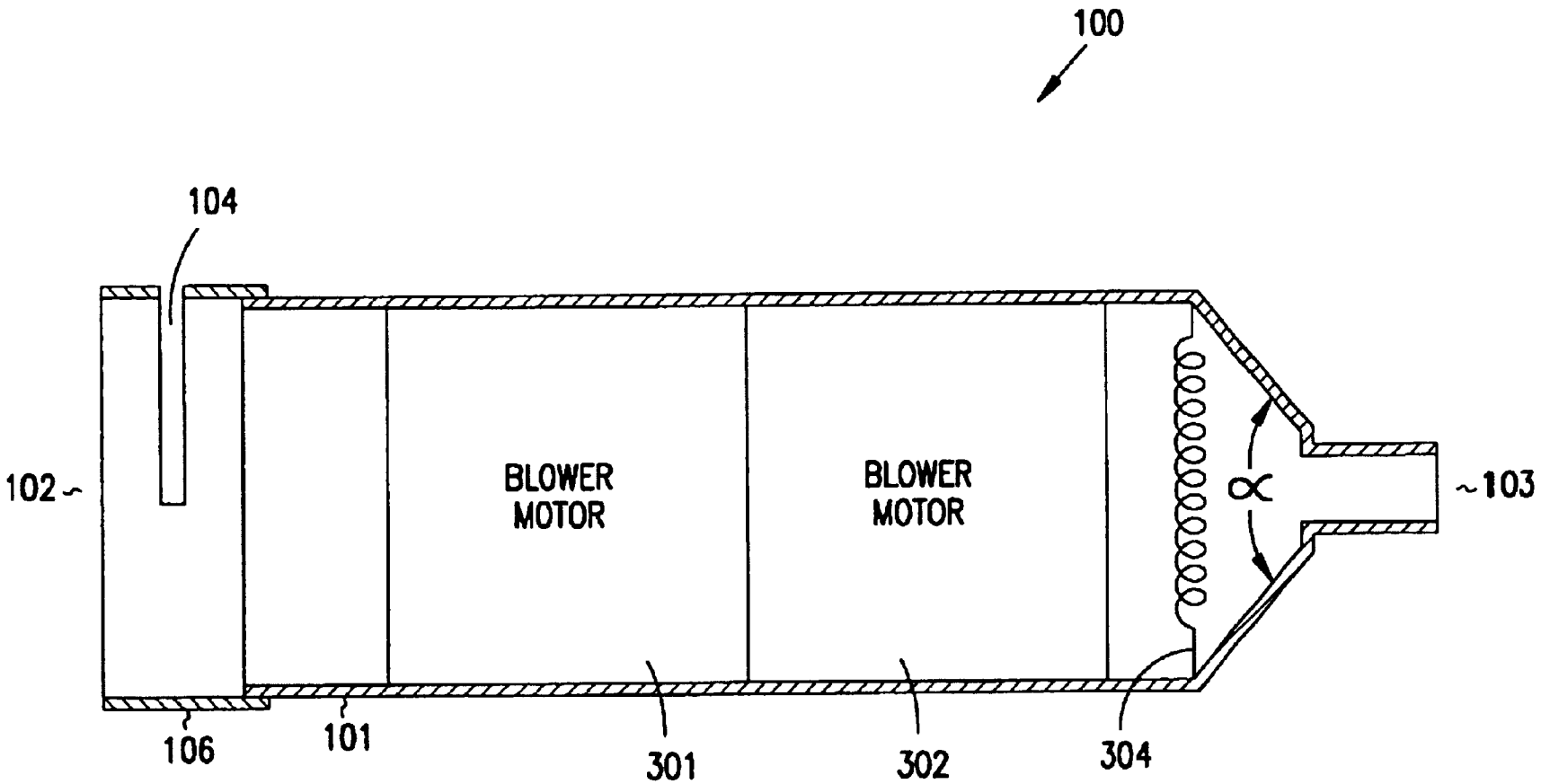
FIG. 3 shows a schematic side view of the livestock blow dryer of FIG. 1.

FIG. 3 shows a schematic diagram of a side, sectional view of livestock blow dryer 100. Mounted within the blower housing 101 is a first blower motor 301 and a second blower motor 302. The motors 301 and 302 are for drawing air through inlet opening 102 and for blowing air through the outlet opening 103. Each blower motor is connected to an independent on/off switch, such as switches 135 and 136, so that the user can choose how much air to use at any given time by choosing to turn on only one or both of the blower motors 301 and 302. The blower motors have a large enough capacity so that they can blow dry livestock, such as cattle, sheep, and/or horses. In one embodiment each blower motor is a model 115923 blower motor, manufactured by Ametek, Lamb Electric Division (Kent, Ohio). Alternatively, the blower motors can be other blower motors having an equivalent capacity. Also, those skilled in the art will recognize that other numbers of blowers could be used (one or three, for example) within the scope of the present invention.

The blower motors 301 and 302 drive fans, blowers, or other air movers which cause air to be drawn in through the inlet opening 102 and to be blown through the outlet opening 103. In this embodiment, the system provides horizontal air flow, drawing the air through inlet opening 102 and blowing it through outlet opening 103. In one embodiment, livestock blow dryer includes a heating element 304 mounted between the motors and outlet opening 103. Heating element 304 is coupled to a switch, such as switch 134. The heating element provides for additional heating of the air, beyond the heat provided by the blower motors, before the air is blown onto the animal, thus speeding the drying time. In one embodiment, the heating element is a model TRI-13XX, 115 Volt, 175 Watt heating element, manufactured by Chromalox (Pittsburgh, Pa.).

Livestock blow dryer 100 also includes a mesh screen 205 attached to inlet cap member 106. The mesh screen 205 substantially covers inlet opening 102. This screen provides filtering for coarse airborne particles before they reach filter member 203 and it also protects filter cartridge 105 from outside damage. This helps prolong the life of filter member 203.

Another aspect of the present invention provides a frusto-conical shaped nozzle 110 on the outlet end of blower housing 101. Nozzle 110 has a wide end 111 and a narrow end 112. The wide end 111 is attached to the blower housing 101 and the narrow end 112 has an outlet opening pointing away from blower housing 101. The nozzle also includes an attaching section 114 for attaching a hose to the nozzle. Attaching section 114 can be adapted to provide for press fitting, screw fitting, or other equivalent mounting of a hose.

Figure 4:
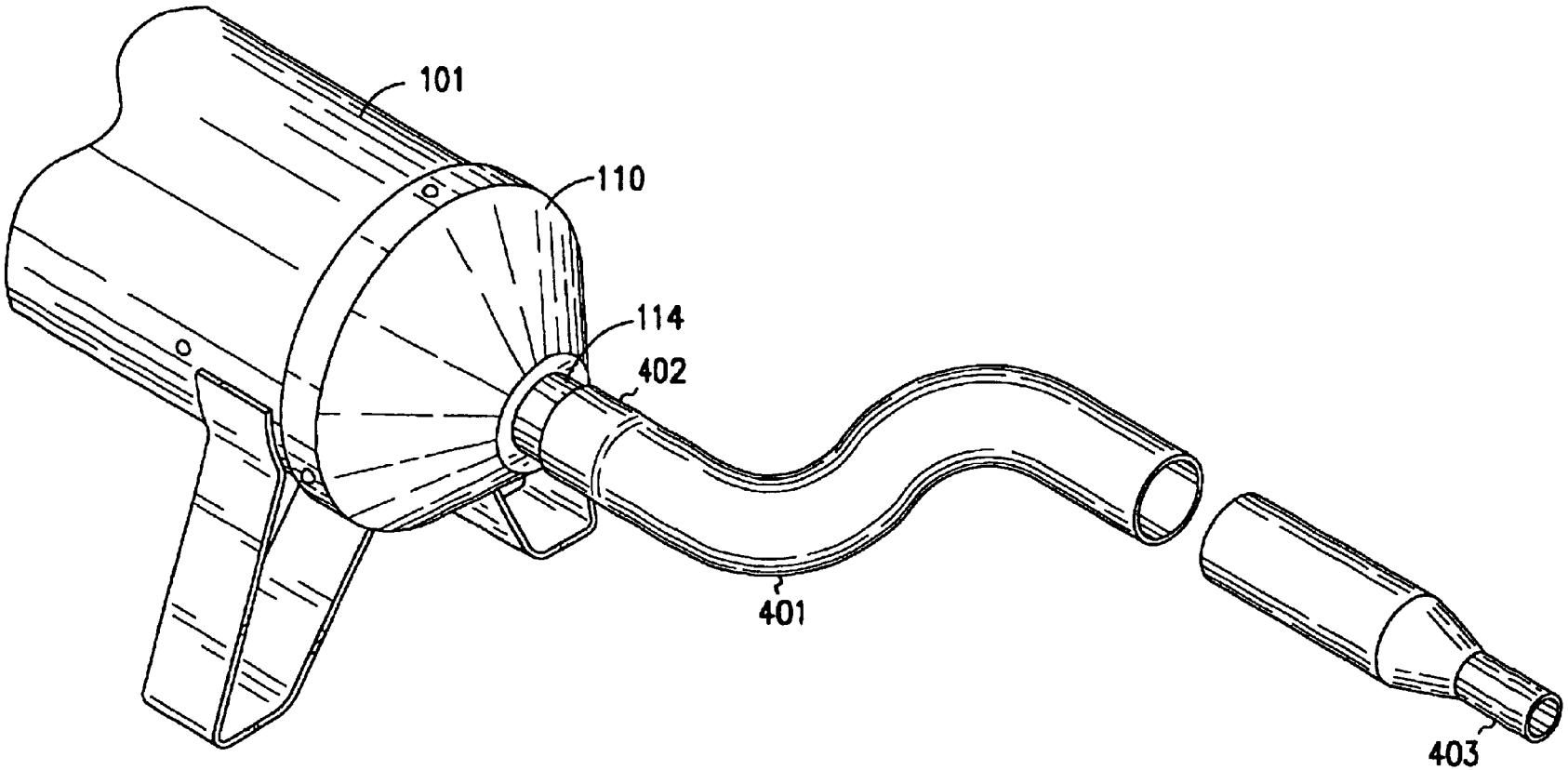
FIG. 4 shows a cut-away side view of a livestock dryer having a hose attached.

FIG. 4 shows one embodiment of an exemplary hose 401 attached to nozzle 110 at attaching section 114. Hose 401 has an attaching section 402 and a nozzle 403. In this embodiment, the hose is friction-fitted and is removed and attached by the user applying a twisting motion. Attaching section 114 permits many different hoses to be attached to livestock dryer 100. Those skilled in the art will also realize that livestock dryer 100 can also be used without a hose attached to it.

The gradual contraction of conical nozzle 110 between the wide end connected to the blower housing and the narrow end at the nozzle opening provides for decreased air flow resistance and decreased pressure loss due to turbulence. This provides for a more efficient blow dryer, permitting more airflow and a higher air velocity for same energy input. In one embodiment, by way of example, but not limitation, conical nozzle 110 has an inner angle $\alpha$ (see FIG. 3) of approximately 90 degrees to 100 degrees. Alternatively, those skilled in the art will recognize that the angle $\alpha$ can vary over a wide range, usually within a range of 45 degrees to 145 degrees. The important thing is that it provides a gradual, rather than abrupt contraction.

In one embodiment, livestock blow dryer 100 also includes a handle 120 attached to the blower housing and a plurality of legs 130 and 131 for setting the livestock blow dryer 100 on a surface. Legs 130 and 131 are modified W-shaped legs. The W-shape provides stability when the livestock blow dryer is placed on uneven ground since it provides for four independent balancing points. Livestock blow dryer 100 also includes a power cord 133, switches 134–136, and an auxiliary power outlet 132.

Exemplary use of System

To use the system described above to dry livestock, a user can either attach a hose 401 to the end of the nozzle or use the livestock blow dryer 100 without a hose. The user turns one or both of the blower motors on and blows the air through the blow dryer until the animal is dry. Since the conical shape improves air flow, and the heating element provides optional extra heating, this can be a quick, energy efficient process. If the air filter gets too dirty, the user grasps tab 204 and pulls filter cartridge 105 out of filter holding section or slot 104. The filter section 203 can be washed or a new filter cartridge 105 can be purchased. The new/clean filter cartridge 105 can then be replaced within slot 104.

Air is drawn into the housing by the blower motor(s) 301 and/or 302. The air is filtered by filter section 203 of filter cartridge 105. The inlet opening 102 is not blocked by the filter housing outer perimeter section 210, thus permitting optimal and efficient air flow at the inlet. The blower motor(s) blow the filtered air through the housing and into nozzle 110. The air passes efficiently through the conical nozzle 110, thus not requiring a relatively high amount of energy. The air leaves the housing through the opening 103 in the nozzle end. The air can go through a hose or other attachment that is attached to attaching section 114.

Conclusion

Advantageously, the present invention provides a sturdy and efficient livestock blow dryer having a means for funneling air efficiently and a means for internally mounting an air filter. The livestock blow dryer efficiently blows an optimal amount of air and it quickly dries an animal. The blower dryer also can be used in rugged conditions because the machines are steady and their air filter is protected from breaking or falling off.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A livestock blow dryer, comprising:

a blower housing having an air inlet opening and an air outlet opening, the blower housing having a filter holding section near the air inlet opening;

at least one blower motor within the blower housing, the at least one blower motor having a capacity for blow drying livestock; and an air filter cartridge adapted to be removably mounted within the filter holding section through a top surface of the blower housing.

2. The livestock blow dryer of claim 1, wherein the filter cartridge comprises:

a perimeter section; and a filter section within the perimeter section.

3. The livestock blow dryer of claim 2, wherein the filter cartridge further comprises a tab attached to the perimeter section for removing the filter cartridge from the filter holding section.

4. The livestock blow dryer of claim 1, wherein the blower housing has a cylindrical shape having the air inlet opening at a first end and the air outlet opening at a second end, and wherein the filter cartridge has a circular shape having approximately the same diameter as the cylindrical blower housing.

5. The livestock blow dryer of claim 1, wherein the filter cartridge is inserted through the top surface of the blower housing and into the filter holding section at a direction perpendicular to an axial direction of the [cylindrical] blower housing.

6. The livestock blow dryer of claim 5, wherein the filter holding section comprises a slot in an inlet cap member.

7. The livestock blow dryer of claim 1, wherein the air outlet opening of the blower housing includes a nozzle having a conical shape, the nozzle having a hose attaching section.

8. A livestock blow dryer, comprising:

a blower housing having an air inlet opening and an air outlet opening;

at least one blower motor within the blower housing for blowing air through the blower housing, the at least one blower motor having a capacity for blow drying livestock; and a nozzle adapted to cover the air outlet opening, the nozzle having a wide end and a narrow end, the wide end attached to the blower housing and having a diameter approximately the same as a diameter of the blower housing, the narrow end pointing away from the blower housing.

9. The livestock blow dryer of claim 8, wherein the narrow end of the nozzle has [an] *a circular* attaching section for attaching a *circular* hose to the nozzle.

10. The livestock blow dryer of claim 8, wherein the blower housing has a substantially cylindrical shape.

11. The livestock blow dryer of claim 8, wherein the nozzle has a substantially frusto-conical shape.

12. The livestock blow dryer of claim 11, wherein the nozzle has an approximately 95 degree internal angle.

13. The livestock blow dryer of claim 8, further comprising a heating element mounted within the blower housing, and a plurality of W-shaped legs.

14. The livestock blow dryer of claim 8, further comprising:

a handle attached to the blower housing for carrying the livestock blow dryer, a plurality of legs for setting the livestock blow dryer on a surface; and wherein the narrow end of the nozzle has an attaching section for attaching a hose to the nozzle, and the frusto-conical shape has an approximately 95 degree internal angle.

15. The livestock blow dryer of claim 14, further comprising a filter holding section, and an air filter cartridge adapted to be inserted into the filter holding section.

16. A livestock blow dryer, comprising:

a cylindrical blower housing having an inlet opening and an outlet opening;

at least one blower motor for blowing air through the outlet opening;

a conically shaped nozzle attached to the outlet opening for permitting air flow out of the blower housing;

a filter holding section proximate to the inlet opening; and a filter cartridge removably mounted within the filter holding section through a top surface of the blower housing, the filter cartridge for filtering air coming into the inlet opening.

17. The livestock blow dryer of claim 16, wherein the filter cartridge comprises:

a circular, outer perimeter section having a tab for removing the filter cartridge from the filter holding section; and a filter section within the outer perimeter section.

18. The livestock blow dryer of claim 17, wherein the filter cartridge has approximately the same diameter as the blower housing.

19. The livestock blow dryer of claim 18, further comprising an inlet cap member having an opening permitting passage of air, the inlet cap member includes a screen covering the opening, and wherein the filter holding section comprises a slot in the inlet cap member.

20. The livestock blow dryer of claim 19, further comprising a heating element mounted within the blower housing for heating the air;

a plurality of legs attached to the blower housing for setting the livestock blow dryer on a surface; and wherein the nozzle includes an attaching section for attaching a hose to the nozzle.

21. A livestock blow dryer, comprising:

a blower housing having an air inlet opening and an air outlet opening, the blower housing having a slot near the air inlet opening;

at least one blower motor within the blower housing, the at least one blower motor having a capacity for blow drying livestock; and an air filter cartridge adapted to be removably mounted within the slot, wherein the slot is located so that the filter cartridge is inserted into the slot at a direction perpendicular to an axial direction of the blower housing.

22. The livestock blow dryer of claim 21, wherein the blower housing has a cylindrical shape having the air inlet opening at a first end and the air outlet opening at a second end.

23. The livestock blow dryer of claim 22, wherein the filter cartridge has a circular shape having approximately the same diameter as the cylindrical blower housing.

24. A livestock blow dryer, comprising:

a blower housing having an air inlet opening and an air outlet opening, the blower housing having a filter holding section which includes a slot in an inlet cap member near the air inlet opening, wherein the blower housing has a cylindrical shape having the air inlet opening at a first end and the air outlet opening at a second end;

at least one blower motor within the blower housing, the at least one blower motor having a capacity for blow drying livestock; and an air filter cartridge adapted to be removably mounted within the filter holding section, the filter cartridge having a circular shape having approximately the same diameter as the cylindrical blower housing, wherein the filter cartridge is inserted into the filter holding section at a direction perpendicular to an axial direction of the cylindrical blower housing.

25. The livestock blow dryer of claim 24, wherein the filter cartridge comprises:

a perimeter section; and a filter section within the perimeter section.

26. The livestock blow dryer of claim 25, wherein the filter cartridge further comprises a tab attached to the perimeter section for removing the filter cartridge from the filter holding section.

27. The livestock blow dryer of claim 24, wherein the air outlet opening of the blower housing includes a nozzle having a conical shape, the nozzle having a hose attaching section.

28. The livestock blow dryer of claim 27, wherein the nozzle has a substantially frusto-conical shape.

29. The livestock blow dryer of claim 28, wherein the nozzle has an approximately 95 degree internal angle.

30. The livestock blow dryer of claim 24, wherein the filter cartridge includes a tab for removing the filter cartridge from the livestock blow dryer, a plurality of ribs attached to an outer perimeter section of the filter cartridge, and a filter section molded to the outer perimeter section and molded to the ribs.

31. The filter cartridge of claim 30, wherein the outer perimeter section of the filter cartridge includes a pair of notches for supporting the filter cartridge when the filter cartridge is mounted within the livestock blow dryer.

32. A livestock blow dryer, comprising:

a cylindrical blower housing having an inlet opening and an outlet opening;

at least one blower motor for blowing air through the outlet opening;

a conically shaped nozzle attached to the outlet opening for permitting air flow out of the blower housing;

a filter holding section proximate to the inlet opening;

a filter cartridge removably mounted within the filter holding section, the filter cartridge for filtering air coming into the inlet opening, wherein the filter cartridge includes a circular, outer perimeter section having a tab for removing the filter cartridge from the filter holding section and a filter section within the outer perimeter section, and wherein the filter cartridge has approximately the same diameter as the blower housing; and an inlet cap member having an opening permitting passage of air, the inlet cap member includes a screen covering the opening, and wherein the filter holding section comprises a slot in the inlet cap member.

33. The livestock blow dryer of claim 32, further comprising a heating element mounted within the blower housing for heating the air;

a plurality of legs attached to the blower housing for setting the livestock blow dryer on a surface; and wherein the nozzle includes an attaching section for attaching a hose to the nozzle.

*34. A livestock blow dryer comprising:*

*a blower housing having an air inlet opening and an air outlet opening, wherein the blower housing has a substantially cylindrical shape;*

*at least one blower motor within the blower housing for blowing air through the blower housing, the at least one blower motor having a capacity for blow drying livestock; and*

*a nozzle shaped to gradually contract from a wide end attached to the blower housing and having a diameter approximately the same as a diameter of the blower housing, to a narrow end pointing away from the blower housing, wherein the narrow end of the nozzle has an attaching section for attaching a hose to the nozzle.*

*35. The livestock blow dryer of claim 34, wherein the nozzle has a substantially frusto-conical shape.*

*36. The livestock blow dryer of claim 34, further comprising:*

*a handle attached to the blower housing for carrying the livestock blow dryer,*

*a plurality of legs for setting the livestock blow dryer on a surface.*

* * * * *